United States Patent [19]
Oldham et al.

[11] 3,789,986
[45] Feb. 5, 1974

[54] PIVOTABLE FLUID DIVERTER FOR RECIRCULATION SYSTEM

[75] Inventors: Robert R. Oldham; John H. Wooddell, both of Sidney, Ohio

[73] Assignee: Robert R. Oldham, Inc., Sidney, Ohio

[22] Filed: Apr. 16, 1973

[21] Appl. No.: 351,273

[52] U.S. Cl. .............................. 210/121, 210/151
[51] Int. Cl. ......................................... B01d 23/10
[58] Field of Search.... 210/8, 121, 123, 151, 15, 17

[56] References Cited
UNITED STATES PATENTS
3,143,498  8/1964  Fordyce et al.................. 210/121 X
3,407,935  10/1968  Burton............................... 210/151

Primary Examiner—Frank A. Spear, Jr.
Attorney, Agent, or Firm—Arthur L. Cain

[57] ABSTRACT

A reservoir for the final treatment of sewage is provided with a fluid diverter, one end of which is pivotally connected to and in open fluid communication with an outlet pipe. The fluid diverter is rigidly connected to a float responsive means on the surface of the liquid collected in the reservoir. A submersible pump within the liquid recirculates liquid by spraying it through a foraminous header disposed above the liquid level. When the liquid level in the reservoir falls below a predetermined liquid level, the diverter returns sprayed fluid to the reservoir. When the liquid level rises above the predetermined liquid level, the diverter diverts fluid into the outlet pipe and continues to do so until the predetermined liquid level is restored.

7 Claims, 4 Drawing Figures

PIVOTABLE FLUID DIVERTER FOR RECIRCULATION SYSTEM

BACKGROUND OF THE INVENTION

This invention relates to improvements in sewage treatment systems, and, more particularly, to improvements in sewage treatment systems of the type in which a clear effluent is obtained by a finishing treatment of a sewage effluent stream which has previously been subjected to a primary and a secondary treatment.

In locations not served by municipal sewage systems, septic tanks, settling systems and other small scale sewage treatment systems are widely used. Separate sewage treatment systems for use, for example, for a house, small apartment complex, or the like, are becoming increasingly popular. Such systems commonly comprise a first settling tank for separating the solid matter from the sewage, a second tank where the sewage, both liquid and solid, is exposed to oxygen and decomposed by a aerobic action and a third tank for final separation by settling. The effluent from the third tank is not always as clear as it should be, and commonly has a minor proportion of solids and an objectionably high biochemical oxygen demand (BOD). It is desirable to treat such an effluent further, both to clarify it as well as to reduce its BOD.

Apparatus conventionally used for the finishing treatment of such an effluent commonly comprises a spray-recirculation tank in which the effluent is recirculated through a spray header to aerate, usually intermittently, and a separate filtration unit through which the aerated effluent is pumped. Such a two-unit system usually requires two pumps.

Another presently used system utilizes a single spray-recirculation tank containing the filtration unit. Incoming effluent is filtered through the filtration unit and a submersible pump spray-recirculates the filtered liquid, usually intermittently. An outlet for the effluent is located at a desired level usually about one foot from the bottom of the tank so as to maintain the liquid level at this height. The disadvantage of this system is that, except where the unit is located on an elevated embankment of the like, the outlet is several feet below the specified discharge level, and therefore, requires a second pump.

The apparatus of this invention combines the simplicity and economy of the single unit, and at the same time, obviates the cost and problems associated with a second pump. Moreover, the raised outlet of the tank permits an accumulation of a surge until such time as the pump should start up, thus permitting better aeration of the liquid in the tank. It will be recognized that where the outlet level, as in the prior art, is situated at the liquid level, any surging of liquid would immediately result in a flow of liquid from the tank.

SUMMARY OF THE INVENTION

It is, therefore, a general object of this invention to provide a new and improved treatment system for "finishing" effluent sewage generated in private dwellings and small clusters or complexes of private dwellings which do not have the benefit of a full-scale municipal sewage treatment plant.

It is also a general object of the invention to provide a simple and rugged fluid diverter enclosed within an aeration tank and a float fixedly attached to the diverter in such a manner as to divert fluid out of the tank when there is an excessive accumulation of liquid in the tank, thus lowering the liquid level within the tank; when the liquid accumulation in the tank is insufficient, the diverter recirculates the liquid in the tank.

These and other objects, features and advantages of this invention will become apparent to those skilled in the art from the following description of a preferred form thereof, reference being had to the accompanying drawings and appended claims.

BRIEF DESCRIPTION OF THE DRAWINGS

The invention is illustrated in the accompanying drawings wherein.

In the figures of the drawing, like reference numerals are used to denote like parts. Some of the parts have been dimensionally exaggerated, for clarity of illustration and to facilitate the description of the operation of the apparatus.

DESCRIPTION OF THE PREFERRED EMBODIMENT

Briefly the treatment system of the apparatus and embodying this invention includes a reservoir, holding tank, or accumulator in which a predetermined liquid level is to be maintained within narrow limits. A filter bed of sand and other particular solid material is disposed within the reservoir above the level of liquid to be maintained. Effluent from a prior sewage treatment system is discharged onto the filter bed and percolates through it to collect in the reservoir directly below. A submersible pump lifts the liquid to a perforated header near the top of the reservoir, from which the liquid is sprayed to aerate the liquid.

Figure 1:
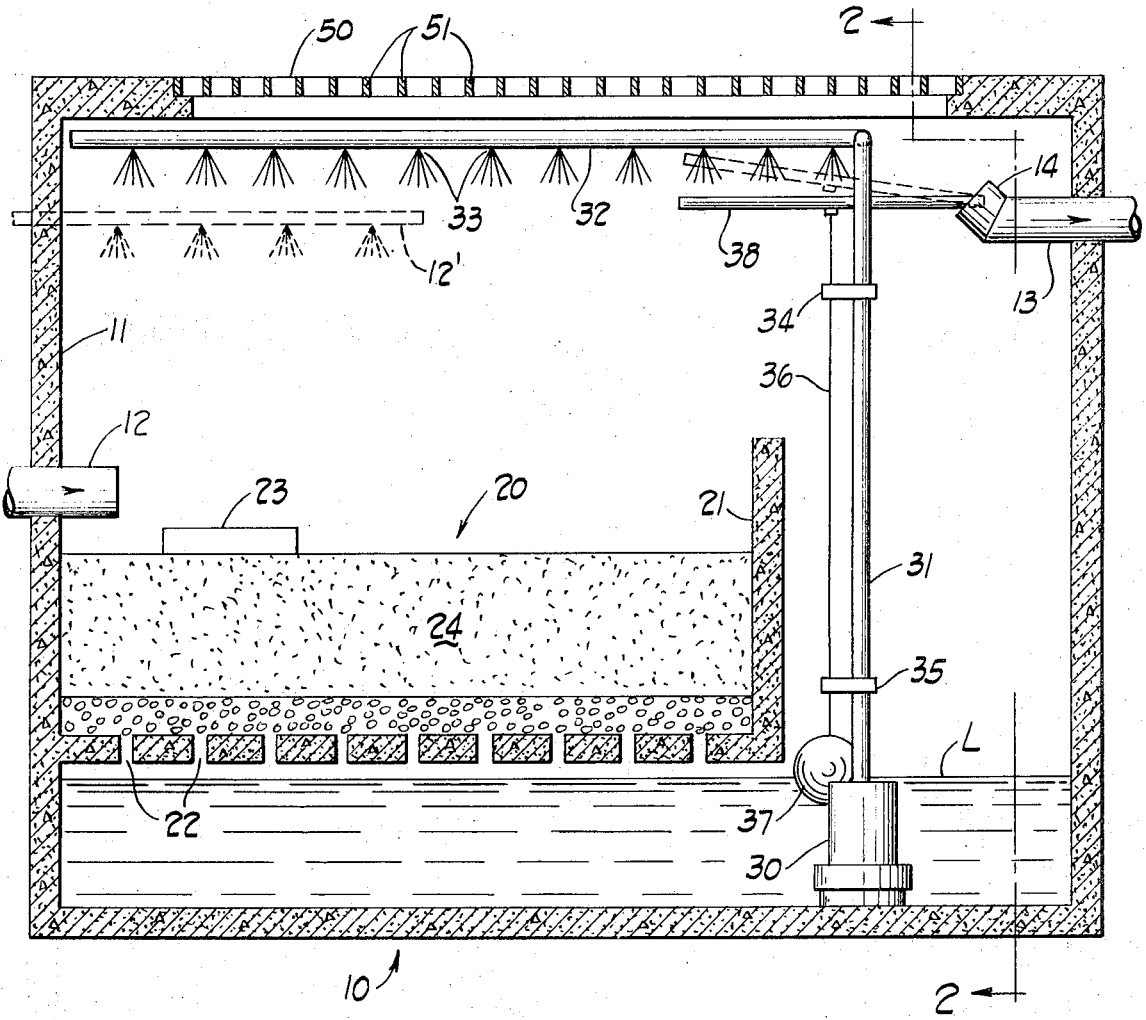
FIG. 1 is a front vertical sectional view of a treatment system for aeration and clarification of sewage, including a reservoir, a sand filter bed disposed within the reservoir and recirculation means for aerating liquid within the reservoir.
Figure 2:
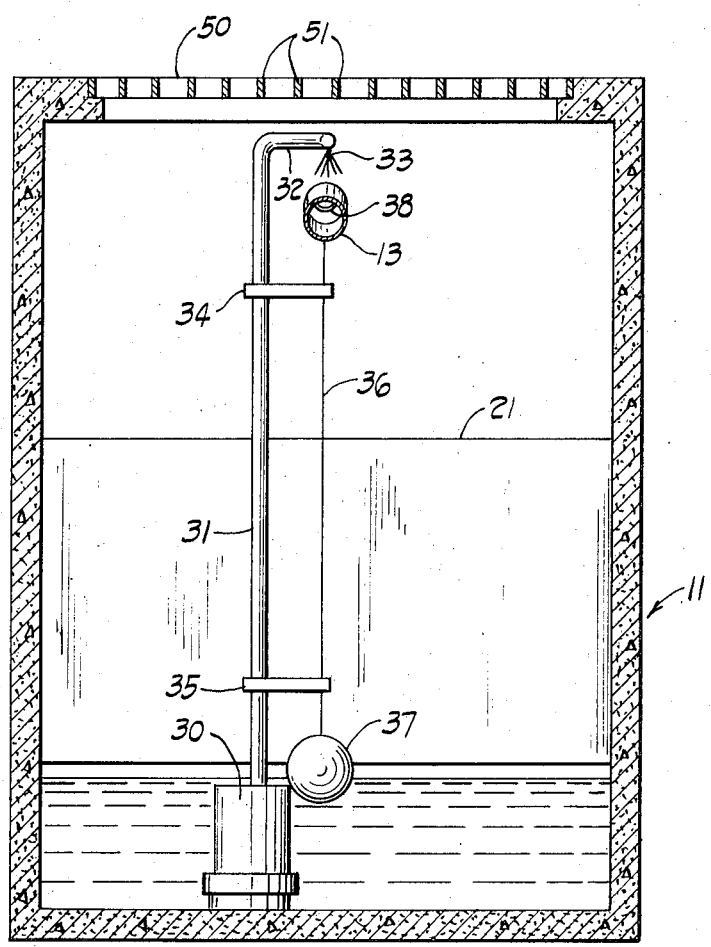
FIG. 2 is a side vertical sectional view of the apparatus of FIG. 1 along the line 2—2.

More particularly, as shown in FIGS. 1 and 2 of the accompanying drawing, the treatment system embodying this invention is indicated generally at 10, and includes a reservoir or tank 11 provided with an inlet pipe 12 in one wall of the tank, and an outlet pipe 13 in another wall of the tank. As will be apparent from the description hereinafter, as long as the outlet pipe is above the desired liquid level to be maintained in the reservoir, the disposition of the inlet and outlet pipes relative to each other is a matter of convenience rather than of critical importance. Where pressure considerations permit, it may be desirable to provide an inlet pipe 12', shown in phantom view in FIG. 1, which is provided with suitable holes through which the incoming effluent may be sprayed into the reservoir thus giving it an initial aeration. Whether introduced into the reservoir through inlet pipe 12 or 12', the incoming fluid is discharged upon a filter unit shown generally at 20 which includes a tray 21 containing successive layers of stone, coarse sand and fine sand to filter the incoming fluid, as is well known in the art. The tray 21 may be formed of any corrosion-resistant material, for example, concrete, glass-fiber-reinforced plastic, and the like. The tray is supported within the reservoir so the bottom of the tray is disposed above a desired predetermined liquid level L to be maintained during operation of the system. For economy, and ease of fabrication, particularly where the reservoir 11 is made of the same material as that chosen for the tray 21, for example, concrete, the tray may be formed as an integral part of the reservoir projecting inwardly from the sides thereof as shown in FIG. 1. The bottom of tray 21 is provided with holes 22 through which incoming fluid percolates into the reservoir 11. Where an inlet pipe 12 is used, a slab 23 is placed atop the filter bed so as to break the force of incoming fluid, and, at the same time, to distribute the fluid over the surface of the filter bed.

Filtered liquid collects in the reservoir and continues to accumulate. A submersible pump 30 rests on the bottom of the reservoir 11, and in normal operation, is immersed by the filtered liquid. The submersible pump serves to recirculate the liquid in the reservoir by pumping the liquid through a discharge line 31 which is in open fluid communication with a spraying means such as a spray header 32. In this embodiment the spray header may be a piece of pipe closed at one end and provided with perforations or holes 33, or slots of suitable diameter, through which the recirculated liquid is sprayed. The spraying means may be of any known type such as for example, a disc sprayer or multiple nozzles. For economy, however, an elongated foraminous conduit is preferred. The conduit may be of convenient shape having multiple orifices 33 disposed within the spraying means so as to enable a portion the sprayed fluid to be selectively collected as will be described hereinafter. The submersible pump 30 may be operated by a conventional timing mechanism which may be set to spray-recirculate liquid for a predetermined interval of time, say 30 minutes every hour on the hour during periods when the sewage system is subjected to heavy loads, and for shorter intervals of time, say 15 minutes, during those periods as for example late at night, when the sewage system is infrequently used, or "coasting." The particular intervals of spray-recirculation to oxygenate the liquid are chosen in proportion to the BOD of the liquid in the tank and the BOD desired in the effluent after it is treated.

An upper guide 34 and a lower guide 35 are fixedly disposed in vertically spaced apart relationship on the discharge line 31. A vertical rod 36 is slidably disposed within the upper and lower guides. The lower end of the rod is fixed to a float 37 which rests on the surface of the liquid in the reservoir. The other end of the rod is fixedly attached to a diverter or spray-collecting means, such as an elongated trough 38, open at both ends, preferably at a point intermediate the open ends. The length of the trough is so chosen as to place a portion of the trough under some of the holes 33 so as to receive liquid sprayed from those holes. The greater the number of holes from which liquid is sprayed into the trough, the more rapidly does the trough divert liquid out of the reservoir. To facilitate adjusting the rate at which the liquid level may be restored, the trough 38 may be extensible.

Figure 3:
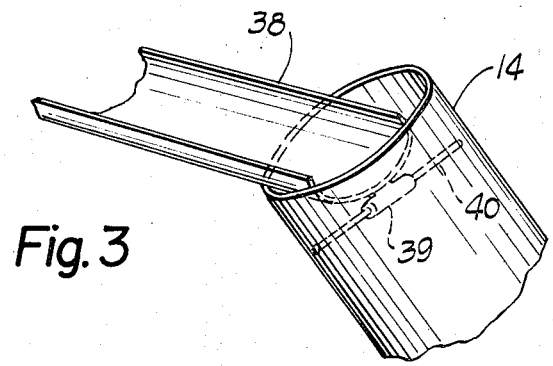
FIG. 3 is a fragmentary perspective view showing in enlarged detail a preferred manner of pivoting the diverter or trough.
Figure 4:
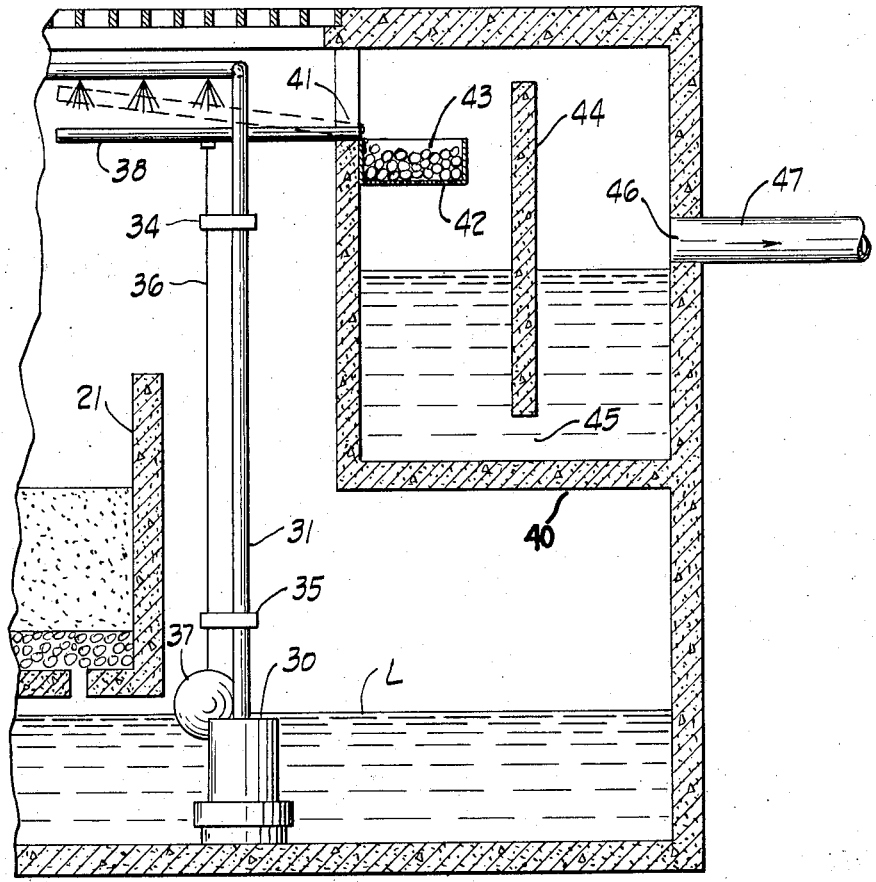
FIG. 4 is a side vertical sectional view of a portion of a reservoir equipped with a chlorine contact chamber, where chlorination is desired.

As shown in FIG. 3, the outlet pipe 13 is preferably provided with an upturned portion 14 in which one end of the trough 38 is pivotally disposed. This may be effected by any pivot means such as pivot pins oppositely disposed in the upturned portion 14 of the outlet pipe 13. A preferred pivot means is a sleeve bearing 39 fixedly attached to one end of the trough and a rod 40 slidably disposed in the upturned portion 14 of the outlet pipe 13. The sleeve bearing 39 and the rod 40 are preferably made from corrosion resistant material which are also unaffected by bacterial growth. Aluminum and polyolefin synthetic resins are most preferred. The rod 36 is fixedly attached to the trough 38, at a point away from the pivot means, so as to selectively place at least a portion of the spray header 32 in open fluid communication with the outlet pipe. This occurs when the trough is inclined upwardly, about and from a horizontal plane through the rod 40, causing liquid in the trough to flow down into the outlet pipe. Alternately, the trough 38 is inclined downwardly from the horizontal plane causing liquid to flow down into the reservoir.

The purpose of recirculating the liquid retained in the tank 11 is to oxygenate the liquid thereby lowering its BOD. Oxygen is economically provided by air which enters the reservoir 11 through a grid 50 having multiple perforations 51. The perforations 51 are preferably large enough to permit easy access of air to and from the reservoir, and at the same time, small enough to prevent undesirable debris from drifting into the reservoir 11. The holes 51 are preferably in the range from about one-fourth inch to 1 inch in diameter. The grid 50 may be made from cast iron, cementitious material, or any corrosion-resistant material which has sufficient strength to function as a cover capable of withstanding the weight of a person, and at the same time, providing a screening function. The cover 50 may be recessed into the top of the reservoir 11 as shown, or be hingedly disposed thereupon for easy access to the interior of the reservoir.

In operation, it is desired to maintain the liquid within the reservoir 11 at a desired mean liquid level L. Incoming fluid from a prior sewage treatment system is introduced into the reservoir 11 through the inlet pipe 12 and is discharged upon the slab 23 and distributed over the surface of the filter bed 24. The fluid percolates through the filter bed and drains through holes 22 into the liquid below leaving the solids in the filter bed. The length of the vertical rod 36 is so chosen that when the liquid level is below the desired means liquid level L, the trough is inclined downwardly from the horizontal plan through the rod 40 so that the end of the trough opposite to the pivoted end is tilted so as to discharge liquid from the trough into the reservoir. If desired the slab 23 may be extended to a position below the downwardly inclined trough to break the force of the discharged liquid and to aid in the distribution of the liquid over the filter bed. But when the liquid level rises above the desired mean liquid level L, the trough is inclined upwardly from a horizontal plane through the rod 40 so the stream from the trough is discharged into the outlet pipe 13. Thus, incoming effluent continues to be filtered through the filter unit 20 and continues to collect in the reservoir 11 until the predetermined mean liquid level L is exceeded, whereupon the float responsive means displaces the trough upwardly with respect to the pivoted end of the trough and a portion of the sprayed fluid is diverted into the outlet pipe. The upwardly inclined attitude of the trough is maintained until enough fluid has been discharged from the reservoir to lower the liquid level L. The float 37 on the liquid surface is lowered a like amount, changing the attitude of the trough 38 to a downward inclination and causing the liquid sprayed from the spraying means to be diverted into the reservoir.

It will be apparent that the pump 30 may be located outside the tank 10 and is not necessarily submerged within the liquid for the purposes of this invention. Similarly, it will be recognized that the trough 38 may be an extensible trough to accommodate units of different capacities and to permit varying the rate at which sprayed liquid may be collected and discharged from the tank.

It will also be recognized from the preferred embodiment described hereinabove that, solids contained in the incoming fluid stream to be treated might eventually plug the filter bed 24. Should this occur, unfiltered fluid would escape over the side of the tray 21 and be eventually discharged from the reservoir without adequate filtration. Those skilled in the art will recognize that it is desirable to make periodic inspections of the quality of the effluent from the outlet pipe 13 to determine whether or not it has been satisfactorily treated. Alternatively, it is desirable to provide means to sense the quality of the fluid discharged from the outlet 13 and to indicate when this quality has regressed below an acceptable level.

In some instances, it may be desirable to chlorinate aerated, recirculated liquid, by contacting the liquid with chlorine pellets in a contact chamber. Such treatment is not expected, generally, to be necessary, but where it is desired, the reservoir 11 is provided with an internal contact chamber, shown generally at 40, in the upper portion of the reservoir 11. The contact chamber 40 has an opening 41 in which the trough 38 is pivotally disposed. Any suitable means of pivoting the trough may be used, such as oppositely disposed pivot pins engaged in slots in the end of the trough, or any other means, substantially as described hereinbefore. A tray 42 is fixedly disposed in the contact chamber 40 so as to receive liquid from the trough 38.

When the liquid level rises above the predetermined liquid level, the trough 38 discharges a preselected proportion of the liquid sprayed from the spraying means into a tray 42, preferably provided with plural drain holes. The tray 42 is stocked with chlorine pellets 43 which may be introduced into the tray in any suitable manner. The contact chamber 40 is provided with a partition or baffle 44 which serves to divide the chamber vertically into two compartments, in open communication with each other, through an opening 45 near the bottom. The partition 44 insures that aerated recirculated effluent is discharged from the trough 38 into contact with the chlorine pellets 43 and then held in the chamber 40 for sufficient time to provide an additional "leveling effect" with respect to surges to which the system is subjected.

Chlorinated liquid accumulates in the contact chamber and continues to accumulate until the level reaches the opening 46 through which the chlorinated liquid flows to outlet pipe 47 from which it is discharged from the system. It will be apparent that the opening 46 is lower than the opening 41, and preferably below the tray 42. It will also be apparent that it is desirable to dispose the contact chamber as high as possible within the reservoir 11 so as not to sacrifice any more liquid head than is necessary.

Modifications, changes, and improvements to the preferred forms of the invention herein disclosed, described and illustrated may occur to those skilled in the art who come to understand the principals and precepts thereof. Accordingly, the scope of the patent to be issued herein should not be limited to the particular embodiments of the invention set forth herein, but rather should be limited by the advance by which the invention has promoted the art.

We claim:

1. In a reservoir having an inlet and outlet means for liquid, wherein a predetermined liquid level is to be maintained in said reservoir by recirculation of sprayed liquid through a spraying means disposed above said liquid level the improvement comprising a float responsive means disposed in said liquid, and spray collection means rigidly affixed to said float responsive means in vertically spaced apart relationship therewith, said spray collection means being pivotally disposed near one end to selectively place a portion of said spray collection means in open fluid communication with said outlet means.

2. The apparatus of claim 1 wherein said spray collection means is alternately inclinable from the horizontal in one direction so as to divert sprayed liquid into said reservoir when said liquid level falls below said predetermined liquid level, and in the opposite direction so as to divert liquid to said outlet means when said liquid level rises above said predetermined liquid level.

3. The apparatus of claim 1 wherein said outlet means is provided with at least one pivot on which said one end of said spray collections means is pivotally disposed.

4. Apparatus for the tertiary treatment of effluent sewage containing a minor amount of solids and having an unacceptable high biological oxygen demand, comprising:
   a reservoir having an inlet means and outlet means, said reservoir being in open communication with an oxygen containing gas,
   filtration means disposed within said reservoir, above a predetermined liquid level, to separate said solids from liquid in said effluent,
   pump means to recirculate said liquid,
   spraying means, disposed above said predetermined liquid level in fluid communication with said pump means, to provide a liquid spray,
   an elongated trough or diverter adapted to receive a portion of said liquid spray, pivotally disposed near one end to selectively place said trough in open fluid communication with said outlet means, said trough being alternately inclinable from the horizontal in one direction so as to divert said spray into said reservoir and in the opposite direction so as to divert said spray to said outlet means, and
   float responsive means rigidly connected to said trough means to effect inclination of said trough in said one direction when the liquid level in said reservoir falls below said predetermined liquid level, and in said opposite direction when the liquid rises above said predetermined liquid level so as to maintain said predetermined liquid level in said reservoir while lowering the biological oxygen demand of said liquid.

5. The apparatus of claim 4 wherein said pump means is intermittently operable and said spraying means is a foraminous conduit closed at one end.

6. The apparatus of claim 4 wherein said trough or diverter is extensible.

7. In a reservoir having an inlet and outlet to a contact chamber disposed within said reservoir for liquid, wherein a predetermined liquid level is to be maintained in said reservoir by recirculation of sprayed liquid through a spraying means disposed above said liquid level the improvement comprising a float responsive means disposed in said liquid, and spray collection means rigidly affixed to said float responsive means in vertically spaced apart relationship therewith, said spray collection means being pivotally disposed near one end to selectively place a portion of said spray collection means in open fluid communication with said contact chamber disposed within said reservoir, and outlet means through which liquid from said contact chamber is discharged.

* * * * *